Nov. 12, 1968   W. IGEL ET AL   3,410,452
APPARATUS FOR LOADING BOBBINS ON HOLDERS
Filed Nov. 4, 1966   5 Sheets-Sheet 4

Inventors
Wolfgang Igel
Werner Weber
Hansjürgen Walk
by Michael S. Striker

United States Patent Office 3,410,452
Patented Nov. 12, 1968

3,410,452
APPARATUS FOR LOADING BOBBINS
ON HOLDERS
Wolfgang Igel, Ebersbach (Fils), Werner Weber, Esslingen, and Hansjuergen Walk, Ebersbach (Fils), Germany, assignors to Zinser-Textilmaschinen Gesellschaft mit beschraenkter Haftung, Ebersbach (Fils), Germany
Filed Nov. 4, 1966, Ser. No. 592,112
Claims priority, application Germany, Nov. 6, 1965, Z 11,849
17 Claims. (Cl. 221—13)

ABSTRACT OF THE DISCLOSURE

An apparatus for loading bobbins has bobbin storage means including an outlet portion permitting passage of bobbins in substantially horizontal position. The apparatus also includes chute means associated with this outlet portion and dispensing means located between the outlet portion and the upper end of the chute means for successively releasing single bobbins from the storage into the chute means. The apparatus also includes operating means for successively operating the dispensing means set forth above, and sensing means for sensing a bobbin holder when the same is transported to a position under the chute means, and for actuating the operating means for operating the dispensing means so that a bobbin passing through the chute means is placed on the holder.

The present invention relates to an apparatus for loading bobbins on holders, and more particularly on holders carried by transporting means which supply the bobbins to the magazine of an automatic bobbin changing device of a spinning machine or twisting machine.

Apparatus serving this purpose is known, and it is one object of the invention to provide an improved apparatus for loading bobbins which reliably operates, takes up little space, and can be economically manufactured.

Another object of the invention is to provide an apparatus which loads the bobbins in such a manner on transporting means that they can be supplied to differently constructed bobbin magazines.

A known magazine for a spinning or twisting machine is provided with an endless transporting belt extending along the machine. In accordance with the invention, the bobbins are placed in the correct position on holders on the transporting belt. It is an advantage of the apparatus of the invention that it can be added to existent machines so that the bobbins can be automatically supplied to the same.

One embodiment of the apparatus of the invention comprises storage means for storing bobbins, and including an outlet portion having a cross section for the passage, and if desired for stacking, of bobbins in substantially horizontal positions; chute means downwardly extending from the outlet portion and having an upper end portion whose cross section is shaped for entry and passage of horizontal bobbins and a lower end portion whose cross section is shaped for the passage of upright bobbins, the chute means including righting means located intermediate the end portions for turning horizontal bobbins to an upright position; dispensing means located between the outlet portion and the upper end portion of the chute means for successively releasing single bobbins from the storage means into the chute means; and transporting means preferably including a transporting belt having a row of holders and moving the same past the lower end portion of the chute means. The movement of the transporting means takes place in timed relationship with the operation of the dispensing means so that the holders successively receive single bobbins discharged from the chute means.

Standard bobbins are conically tapered tubes having a wider end and a narrower end. The apparatus of the invention preferably includes a device for separating bobbins from each other whose narrower ends point in opposite directions while the bobbins are located in the outlet portion of the storage means. Bobbins which are not in a position suitable for being received by the holders, are either inverted, or collected separately. The advantage of such an arrangement is that it is not necessary to carefully check the positions of the bobbins thrown into the storage means of the apparatus.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIGS. 14 to 20 illustrate a separating device used in the embodiment of FIGS. 12 and 13 wherein

Referring now to the drawings, and more particularly to the embodiment of FIGS. 1 to 7, a box-like storage container 2 receives bobbins 4 in substantially horizontal positions. The bobbins are slender tapered tubes whose shape is best seen in the lower portion of FIG. 1, and in the embodiment of FIG. 1, the bobbins are manually placed in storage container 2 in a position in which the narrower ends all point to the same side.

The bottom of storage container 2 is partly formed by a slide 6 operable by a handle 5 and having in the longitudinal direction of the bobbin 4, the same width as the storage container 2, which is slightly greater than the length of bobbin 4. An opening 8 is provided in the bottom wall of container 2 and can be closed or opened by slide 6. Since opening 8 is shorter than the length of container 2, slanted guide surfaces 7 are provided for guiding bobbins toward opening 8.

Figure 2:
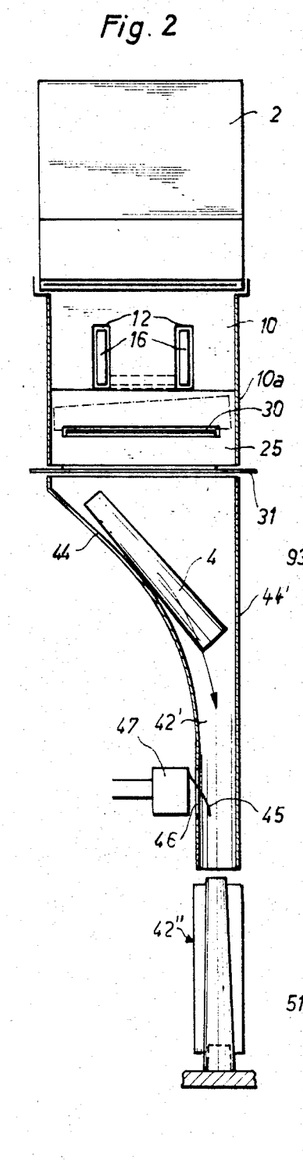
FIG. 2 is a side view of the apparatus, partially shown in vertical section.

The storage container 2 is detachably placed on a supporting trough 9 provided with lateral walls 9a preventing displacement of storage container 2. A hopper 10 forms part of the storage means for the bobbins and has an upper inlet opening 10' opposite opening 8 so as to receive the bobbins released by retraction of slide 6. Hopper 10 has an outlet portion 10a whose cross section is rectangular and corresponds to the shape of bobbins 4. The outlet opening 10", which has the same cross section, is arranged eccentric to the inlet opening 10' so that the hopper walls 11 and 11' are slanted at different angles. As best seen in FIG. 2, the less slanted guide wall 11 has a pair of rectangular openings 12 which permit a pair of plates 15 to enter into the interior of hopper 10, and to engage with a pair of slanted end faces 16 the bobbins 4 located in the same for the purpose of loosening jammed bobbins. For example, a group of bobbins may jam and support each other on walls 11, 11' to form a bridge 68 closing the outlet opening of hopper 10, as shown in FIG. 5. When the agitating plates 15 are moved to the operative position shonw in FIG. 4, the jammed bobbins will be loosened and freed so that the sliding of bobbins into outlet portion 10a will continue.

Figures 1, 3:
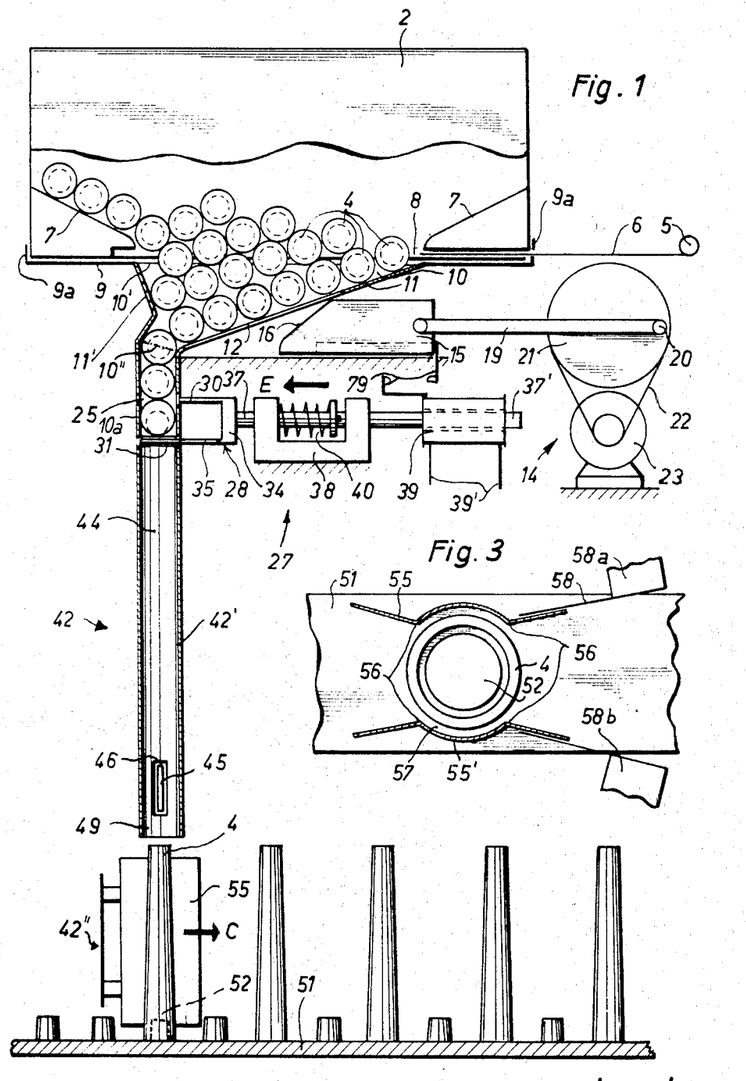
FIG. 1 is a front view of one embodiment of the invention, partially in vertical section.
FIG. 3 is a plan view illustrating a detail of the apparatus of FIG. 1 on an enlarged scale.

Plates 15 are secured to each other and pivotally connected with a crank 19 whose other end is pivotally connected by pivot 20 to a wheel 21 driven by a belt 22 from an auxiliary motor 23. The inoperative position of the agitation means is shown in FIG. 1, and the operative position shown in FIG. 4.

The outlet portion 10a has a rectangular cross section 25 corresponding to the outline of a bobbin, so that several bobbins are stacked in outlet portion 10a when the same is closed by a stop wall 31 of a dispensing device, generally indicated by reference numeral 27, and adapted to successively release single bobbins from the storage means 2, 10, 10a. Wall 31 is connected by a vertical wall 34 to another narrower wall 30 to form with the same a slide 28, best seen in FIG. 6. Stop wall 31 has a rectangular opening 35 permitting the passage of a bobbin in the horizontal position and located opposite the narrower stop wall 30. Connecting wall 34 has such a height that stop walls 30 and 31 are spaced from each other a vertical distance slightly greater than the maximum diameter of a bobbin. Stop wall 31 projects transversely from opening 35 a distance substantially corresponding to the width of outlet portion 10a or to the width of a bobbin. Connecting wall 34 of dispensing slide 28 is secured to a link rod 37 which is guided in aligned bores of a guide member 38. The armature 37' of an electromagnet 39 is secured to link rod 7. Electric current is supplied to electromagnet 39 by terminals 39' so that dispensing slide 28 can be moved between the blocking position shown in FIG. 1 and the releasing position shown in FIG. 5. A spring 40 abuts the stationary support 38 and a flange fixed to link rod 37 so that slide 28 is biased to move to the blocking position shown in FIG. 1. When electromagnet 39 is energized, spring 40 is compressed, and slide 28 moved to the releasing position shown in FIG. 5.

In the blocking position, wall 31 closes the lower end of outlet portion 10a, and stop wall 30 is located outside of the same. In the releasing position, stop wall 30 is located between the lowermost bobbin and the next following second bobbin and supports the latter while the lowermost bobbin drops through opening 35. During the retraction of slide 28 to the blocking position, stop wall 31 closes the outlet of outlet portion 10a before the second bobbin drops onto the same and is stopped. It will be understood that this operation is enirely independent of whether the bobbins 4 are properly arranged in the storage means as shown in FIG. 1, or are jammed as shown in FIG. 5.

Chute means 42 are disposed under the storage means and include a chute 42' having an upper end portion with a curved wall 44, best seen in FIG. 2, and a lower end portion of tubular shape having an outlet 49. A guiding device 42" is disposed under the lower end of the chute. The upper end portion of the chute has a rectangular cross section registering with the outlet of portion 10a so that bobbins can fall in horizontal position into the chute when the dispensing device 27 is in the bobbin releasing position. The curved wall 44 serves as a righting means for turning horizontal bobbins to an upright position before the bobbin enters the tubular lower end portion of the chute whose inner diameter is slightly greater than the diameter of the bobbin 4. The wall portion 44' of the chute 42' is substantially straight and cooperates with the curved wall 44 for turning the falling bobbin 4 to the upright position. The lower tubular end portion of the chute may have a square or circular cross section.

Near the outlet 49 of chute 42', a feeler 45 projects through a cutout 46 into the interior of the chute. Feeler 45 is engaged by each bobbin dropping in the chute and actuates a switch 47 connected into the circuit of the apparatus which will be described with reference to FIG. 7, and controls electromagnet 39 of the dispensing device.

The guiding device 42" of the chute means 42 serves the purpose of assuring a precise and reliable engagement of the dropping bobbin with a holder 52. A conveyor including a belt 51 having a row of holders 52 in the form of upwardly projecting studs, moves the holders consecutively to a position located directly under the outlet 49 of chute 42' and in the region of the guiding device 42" which guides the dropping bobbin until its lower and wider end portion surrounds the respective holder 52.

As best seen in FIG. 3, the guiding device has two resilient guide plates 55, 55' secured by leaf springs 58, 58' to stationary carrier members 58a, 58b. Guide plates 55 and 55' have arcuate portions concentric with the axis of the chute 42' and guiding the bobbin in the desired direction after the same has moved out of chute 42'. During movement of conveyor 51 in the direction of the arrow C in FIG. 1, a bobbin attached to a holder 52 is moved with the conveyor, engaging the resilient guide plates 55, 55' and spreading the same apart while moving out of the position located under the outlet 49 of chute 42'. Since the edges 56 of guide plate 55, 55' are spaced a distance smaller than the diameter of the bobbin 4, as best seen in FIG. 3, each bobbin is resiliently held in the correct position for attachment to a holder stud 52.

Figure 7:
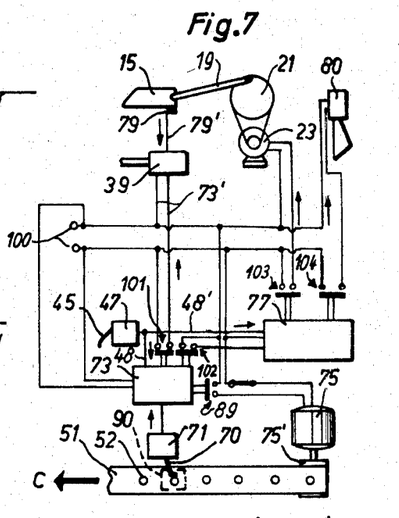
FIG. 7 is a diagrammatic view illustrating an electric circuit connecting several electrically operated devices of the embodiment of FIG. 1.

Referring now to FIG. 7, the position of the guiding device 42" is schematically indicated at 90. A motor 75 drives a pulley 75' by which the transporting belt 51 of holders 52 is moved in the direction of the arrow C. The motor is energized by closing of a switch 89. A sensing means 70 of another switch 71 senses the arrival of a holder 52 at the loading point at which the chute and the guiding device are located and controls a relay 73 which operates switch 89 to disconnect motor 75 so that the conveyor 51 stops in the proper position of a holder 52.

A voltage source 100 is connected by a line 73' with electromagnet 39 and energizes the same when sensing means 70 is actuated. A suitable relay contact 101 is controlled by relay 73 and located in line 73'. The respective relay contact automatically opens after a predetermined time period so that electromagnet 39 is again de-energized and permits dispensing means 27 to assume the normal blocking position.

Relay 73 also has relay contacts 102 connected into the circuit of a timing device 77 which is also connected by line 48' to switch 47 which is operated by feeler 45. The arrangement is such that after energization of relay 73 by the sensing switch means 70, 71, the timing device 77 starts its operation which is continued until feeler 45 senses a dropping bobbin whereupon the timing device is set back to its initial position. If no bobbin drops through the chute and engages feeler 45 during a predetermined time period, timing device 77 closes a switch 103 in the circuit of the auxiliary motor 23 which starts to operate crank means 21, 19 by which the agitating slide 15 is reciprocated for freeing and loosening jammed bobbins. However, auxiliary motor 23 will also be started if no bobbins are stored any more in the storage means 2, 10, 10a. If a bobbin is freed by the agitating means and drops through the chute, feeler 45 responds and switch 47 returns the timing device to its initial position whereby auxiliary motor 23 is disconnected and stops. At the same time, motor 75 is again energized since relay 73 receives an impulse from switch 47 to close switch 89 in the circuit of motor 75.

In the event that no bobbin drops into the chute and actuates feeler 45 after start of the operation of the agitating member 15, the timing device 77 operates switch 104 which operates an alarm device 80 after a predetermined time period informing the operator of the machine that a container 2 containing a new supply of bobbins has to be placed on the support 9.

When container 2 with a supply of bobbins 4 is in the proper position, slide 6 is withdrawn, and bobbins 4 fall into the hopper 10 and three bobbins are stacked in horizontal positions in the outlet portion 10a of the storage means, resting on stop wall 31 of the dispensing slide 28 which is in the blocking position shown in FIG. 1 due to the action of spring 40. Motor 75 moves the conveyor means 51 with holders 52 past the outlet 49 of chute 42', and when one of the holders 52 is in the proper position, sensing switch means 71 senses the respective holder and energizes relay 73 which opens switch 89 and stops motor 75 with conveyor 51 and respective holder 52. At the same time, relay 73 closes the relay contacts 101, to energize electromagnet 39 so that the dispensing slide 28 is moved to the releasing position shown in FIG. 5 in which the lowermost bobbin 4 drops through opening 35 into the chute 42', while the next following bobbin rests on stop wall 30. Electromagnet 39 is automatically de-energized so that spring 40 returns dispensing slide 28 to the blocking position of FIG. 1 whereby the retracted stop wall 30 permits dropping of the next following bobbin onto stop wall 31, while the remaining bobbins in the storage means follow downwardly.

The lowermost bobbin released by dispensing slide 28 drops through the chute and is turned by the righting walls 44 and 45' from a horizontal position to a vertical position in which it drops out of the outlet 49 at the lower end of chute 42', into the guiding device 55, 55' and onto the holder 52 which was properly positioned by stopping motor 75 and conveyor means 51 under the control of sensing means 70, 71.

While the bobbin drops in upright position, it actuates the feeler 45 of switch 47 which provides an impulse for relay 73 causing switch 89 to close so that motor 75 starts again and moves conveyor 51 with holder 52 carrying the bobbin in the direction of the arrow C whereby the resilient guide plates 55, 55' are spread to permit passage of the attached bobbin 4 as best seen in FIG. 3. When the next following holder arrives in the proper position, it is sensed by sensing means 70, and motor 75 is stopped and the operation repeated.

Whenever the relay 73 is energized, it operates the relay contacts 102 to start the operation of the timing device 77. The operation of the dispensing device 27 by energization of electromagnet 39 by relay 73 has caused release of a bobbin so that the same engages feeler 45 and operates switch 47 which sets the timing device back to its initial position. During normal operations, the timing device will always be set back before a predetermined time period indicating a disturbance in the delivery of bobbins through chute 42' has passed.

Figures 4, 6, 13:
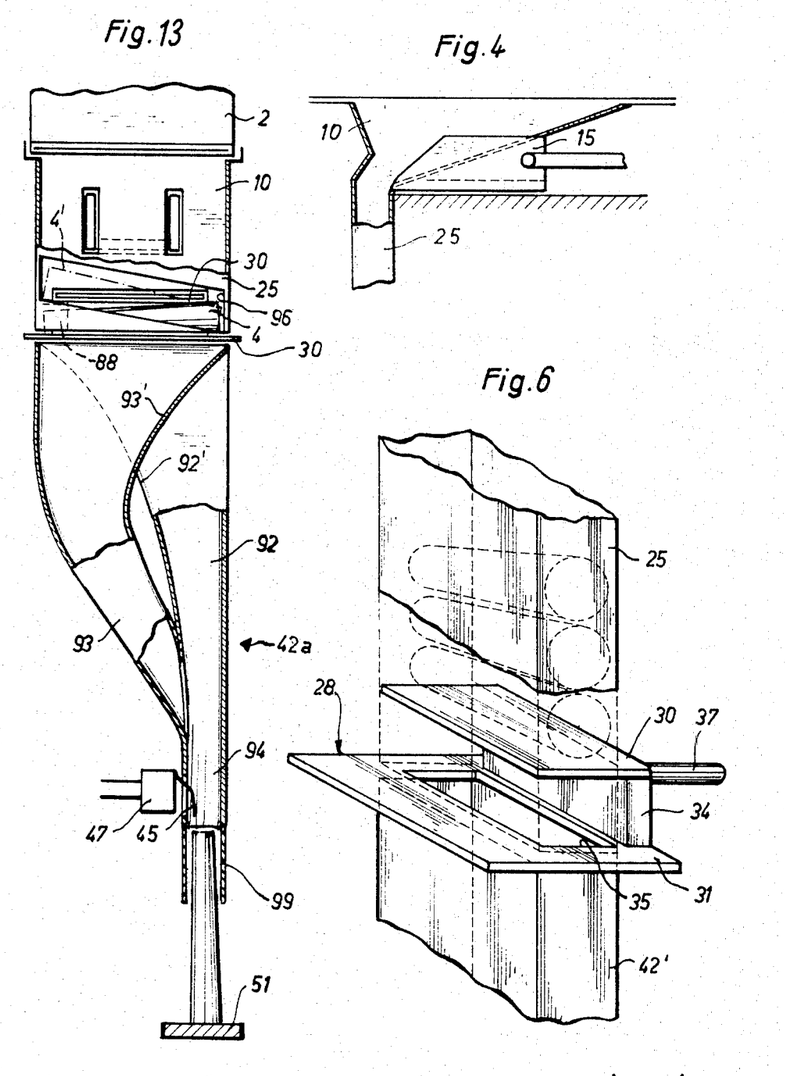
FIG. 4 is a fragmentary front view, partially in vertical section, illustrating an agitating device of the embodiment of FIG. 1 in another operational position.
FIG. 6 is a fragmentary perspective view illustrating the dispensing device on an enlarged scale.
FIG. 13 is a side view, partially in section, illustrating the embodiment of FIG. 12.
Figures 5, 8, 9:
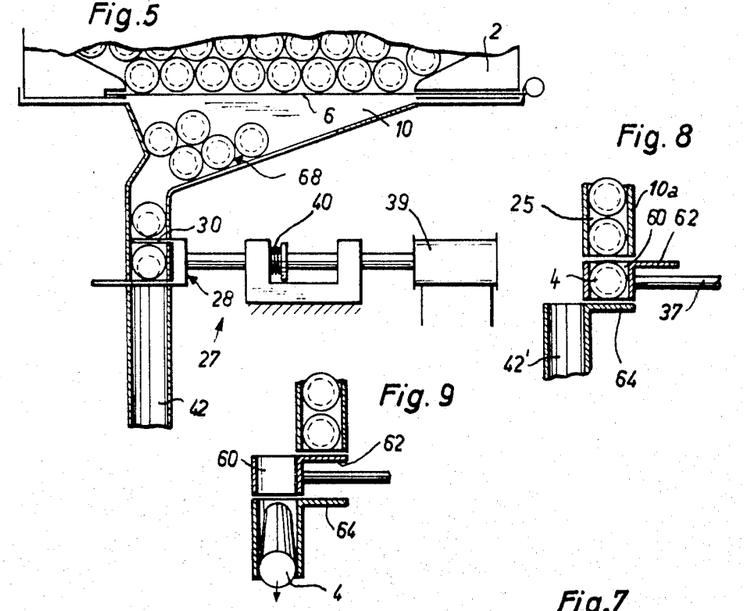
FIG. 5 is a fragmentary vertical sectional view illustrating a part of the embodiment of FIG. 1 including a dispensing device shown in another operational position.
FIGS. 8 and 9 are fragmentary vertical sectional views illustrating a modified construction of the dispensing device in different operational positions.

In the event that the bobbins are jammed in the storage means so that dispensing slide 28 cannot release a bobbin, or in the event that the supply of bobbins in the storage means is exhausted, feeler switch 45, 47 will not be actuated, and the timing device will operate a predetermined time period after which it closes a switch 103 connecting auxiliary motor 23 into the circuit so that the agitating means 15 start a reciprocating movement to and from the operative position shown in FIG. 4 for freeing jammed bobbins. When the agitating means release bobbins to fall into the outlet portion 10a and through the chute 42', feeler 45 will be engaged, and the timing device set back by switch 47 to its initial position, the respective switch 103 is opened, and auxiliary motor 23 with the agitating means 15 is stopped so that the operation continues. However, if the operation of the agitating means 15 does not result in the dropping of a bobbin and actuation of feeler 45, the supply of bobbins in the storage means means may be exhausted, or another serious disturbance may require the presence of an operator which after a further time period is alerted by a signal produced by the device 80 under the control of the timing device at the end of an extended time period.

Figure 10:
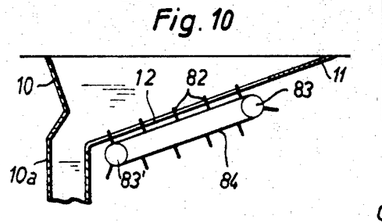
FIG. 10 is a fragmentary vertical sectional view illustrating the storage means of the apparatus in combination with a modified embodiment of the agitating device.

FIG. 10 illustrates a modified agitating device including an endless band 84 passing over rollers 83, 83', one of which is driven by a motor corresponding to auxiliary motor 23. The endless band 84 has projecting pins passing through a slot in wall 11 into the interior of hopper 10 and driving jammed bobbins toward the outlet portion 10a.

Figure 11:
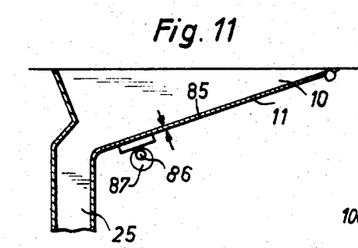
FIG. 11 is a fragmentary vertical sectional view illustrating the storage means of the apparatus with another modification of the agitating device.

Another modified embodiment of the agitating means is shown in FIG. 11. Hopper 10 has a thin wall 11 adapted to be deflected in the region 85. A plate abuts wall portion 85 and is engaged by an eccentric roller 87 rotated by shaft 86 connected to an auxiliary motor 23. When motor 23 is started, as explained above, wall 11, 85 will vibrate and oscillate and jammed bobbins will be loosened to drop through the outlet 25. Evidently, vibrations of wall 11, 85 could be produced by an electromagnetic vibrator.

A modified construction of the dispensing means is illustrated in FIGS. 8 and 9. The upper end of chute 42' is staggered in relation to the outlet 25 of outlet portion 10a, and spaced from the same.

The dispensing slide has a tubular portion 60, and a stop wall 62. The upper end of the chute is provided with another stop wall 64 located under outlet 25. The connecting rod 37 is operated as described with reference to FIG. 1. In the normal blocking position shown in FIG. 8, the lowermost bobbin 4 is located in the tubular portion 60 of the dispensing slide, resting on stop wall 64. When the dispensing slide is moved to the releasing position shown in FIG. 9, the lowermost bobbin moves therewith and immediately drops into the chute when tubular portion 60 is located outside of stop wall 64. The next following bobbin is still located in outlet portion 10a, blocked by stop wall 62 of the dispensing slide. Upon return of the slide to the position of FIG. 8, the next following bobbin in outlet portion 10a drops into the tubular portion 60, resting on stop wall 64.

FIGS. 12 to 20 illustrate a modified construction of the invention which corresponds to the construction described with reference to FIGS. 1 to 7 so that like reference numerals are used for indicating corresponding parts. This embodiment permits it to fill the storage means at random with bobbins 4 whose narrower ends point in opposite directions, as indicated by reference numerals 4, 4', resulting in time saved by the operator which has to fill storage container 2. However, it will be understood that if the storage means were filled in this manner in the embodiment of FIG. 1, some of the tubes would be attached to holders 52 in a wrong inverted position.

This is avoided in the embodiment of FIGS. 12 to 20 by providing separating means for separating bobbins in the proper position from bobbins in inverted position.

Figure 14:
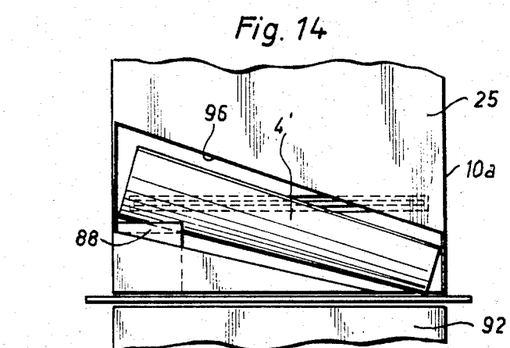
FIGS. 14 and 15 are, respectively, a fragmentary front view and side view of a separating device.
Figure 15:
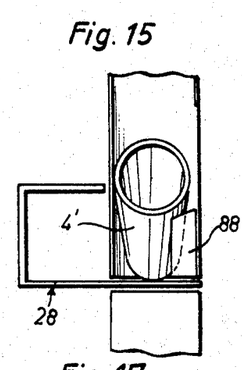
Figure 20:
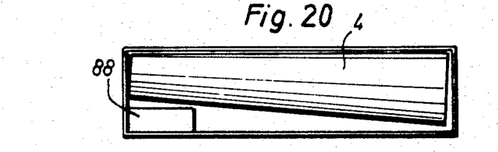
FIG. 20 is a plan view illustrating the operational condition of FIGS. 16 and 17.

A blocking means in the form of a prismatic body 88, as best seen in FIGS. 14, 15 and 20, is secured to the wall of the outlet portion 10a. Bobbins 4 located in the position of FIG. 20 with the narrower end located adjacent blocking body 88, can freely drop into channel 92 of the chute 42a when the dispensing slide is operated to assume the releasing position shown in FIG. 17 in which opening 35 in stop wall 31 registers with the outlet opening of portion 10a and with the upper end of the chute. This position of bobbin 4 is also illustrated in solid lines in FIG. 13.

Figure 18:
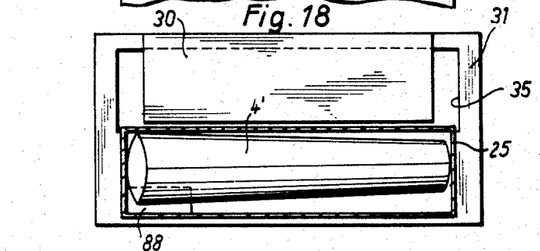
FIG. 18 is a plan view, partially in section, illustrating the operational condition of FIGS. 14 and 15.

If a bobbin is in the inverted position 4' shown in chain lines in FIG. 13, and also in FIGS. 14, 15 and 18, the thicker end of bobbin 4' cannot pass blocking body 88 and rests on the same so that the inverted bobbin 4' assumes the slanted position best seen in FIG. 14. The outlet portion 10a is provided with a slanted discharge opening 96 whose position and shape corresponds to the position of an inverted bobbin 4' resting on blocking body 88, as best seen in FIG. 14. When dispensing slide 28 is operated in the position of FIG. 15, stop wall 30 engages the slanted bobbin 4' in the position of FIG. 19 and pushes the same out of opening 96 and into a second channel 93 provided with a curved wall 93' which turns bobbins 4' to an upright position in which the thicker end is located at the lower end of the dropping bobbin which passes through an opening in channel 92 into the end portion 94 of the chute. In this end portion, all bobbins are in the same upright position and adapted to engage a corresponding holder on conveyor 51, as explained above.

Figure 16:
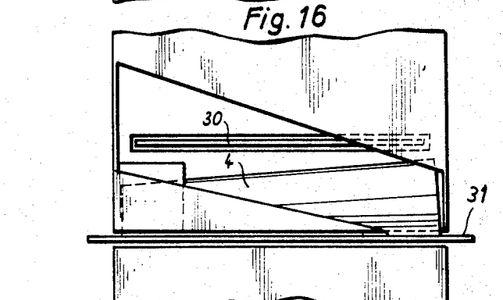
FIGS. 16 and 17 are, respectively, a front view and a side view of the separating device in another operational condition.
Figure 17:
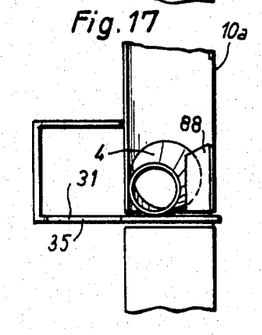
Figure 19:
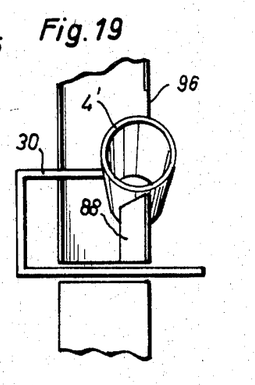
FIG. 19 is a side view illustrating another operational condition of the separating device.

As best seen in FIGS. 14 and 15, the opening or window 96 is of rectangular or trapezoidal shape permitting the ejection of a bobbin 4' in the position of FIG. 19. FIGS. 16 and 17 show the bobbin 4 in the normal position which permits bobbin 4 to assume a position fully resting on stop wall 31 so as to drop into channel 92 when the dispensing means is operated. FIGS. 17 and 20 illustrate the same position of bobbin 4.

Figure 12:
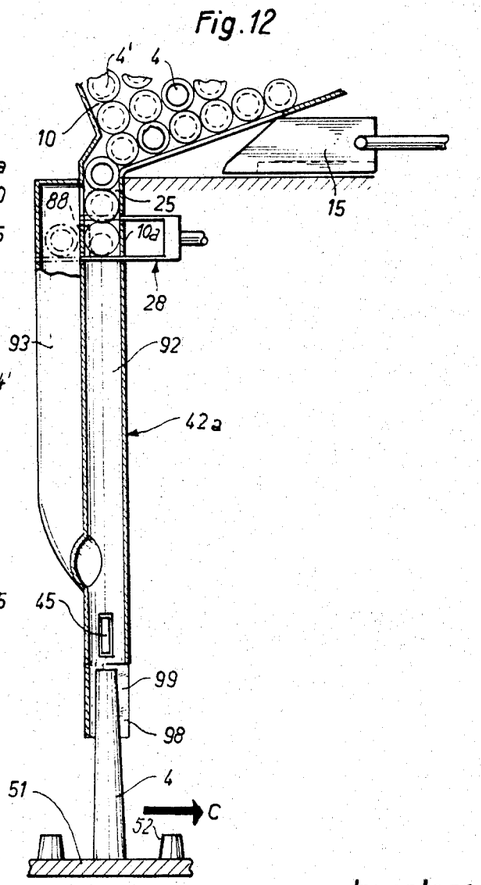
FIG. 12 is a front view, partially in section, illustrating a modified embodiment of the apparatus.

In the modification illustrated in FIGS. 12 and 13, the guiding device 55, 55' may be omitted, since the lower end of the chute is extended by a U-shaped portion 99 having an outlet slot 98. The extension 99 embraces the upper end of a bobbin 4 already attached to a holder 52 so that bobbin 4 is guided until properly supported on the holder. During the movement of conveyor 51, bobbin 4 passes through opening 98.

The separating device particularly illustrated in FIGS. 12 to 20 may also be used for other apparatus for placing inverted horizontal bobbins or other elongated objects in the same upright position.

It will be understood that each of the elements described above, or two or more together, may also find a useful application in other types of apparatus for attaching bobbins to supporting studs or spindles differing from the types described above.

While the invention has been illustrated and described as embodied in an apparatus for loading bobbins on holders of movable transporting means supplying the bobbins to a magazine of a spinning or twisting machine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of the invention and, therefore, such adaptations should and are intended to be comprehended within the meaning and range of equivalence of the following claims.

What is claimed as new and desired to be secured by Letters Patent is:

1. An apparatus for loading bobbins on holders, comprising, in combination, storage means for storing bobbins, and including an outlet portion having a cross section for the passage of bobbins in substantially horizontal positions: chute means downwardly exerting from said outlet portion and having an upper end portion whose cross section is shaped for entry and passage of horizontal bobbins and a lower end portion whose cross section is shaped for the passage of upright bobbins, said chute means including righting means located intermediate said end portions for turning horizontal bobbins to an upright position; dispensing means located between said outlet portion and said upper end portion of said chute means for successively releasing single bobbins from said storage means into said chute means; operating means for successively operating said dispensing measn for successively releasing single bobbins from said storage means into said chute means; transporting means having a row of holders and being operable to move said holders of said row successively past said lower end portion of said chute means so that holders of said row receive and support single bobbins discharged from said chute means; and sensing means associated with said transporting means for sensing holders located under said lower end portions of said chute means and for actuating said operating means for operating said dispensing means while a holder is located under said lower end portion of said chute means.

2. An apparatus according to claim 1 wherein said upper end portion of said chute means is staggered in relation to said outlet portion and spaced from the same, said upper chute end portion having a projecting stop wall located under the lower end of said outlet portion spaced from the same a distance substantially corresponding to the diameter of a bobbin; and wherein said dispensing means includes a reciprocable member having a tubular portion and a stop wall portion, said reciprocable member having a blocking position in which said tubular portion of said reciprocable member surrounds a bobbin resting on said stop wall of said chute means so that the surrounded bobbin cannot fall into said staggered upper end portion of said chute means, and a releasing position in which said tubular portion registers with said upper end portion of said chute means so that the bobbin drops out of said tubular portion into said chute means, while said stop wall portion of said reciprocable member closes the lower end of said outlet portion of said storage means.

3. An apparatus for loading bobbins on holders according to claim 1, including also operating means for said transporting means for step-by-step movement of said transporting means, said operating means being also actuated by said sensing means each time a bobbin passes through said chute so that said holders of said transporting means are located successively under said chute means adapted to receive bobbins successively passing through said chute means.

4. An apparatus according to claim 1 including drive means for driving said transporting means; and an electric control circuit connected with said drive means and with said auxiliary motor, and including a first switch having a feeler located in said lower end portion of said chute means and responsive to dropping bobbins, a second switch having sensing means for sensing the position of said holders, a timing device having a switch controlling said auxiliary motor, a relay having a relay switch controlling said drive means and contact means controlling said timing device, said relay being controlled by said first and second switches so that if no dropping bobbin engages said feeler within a predetermined time period after sensing of a holder, said auxiliary motor operates said agitator member, and so that said timing device stops said auxiliary motor when said feeler is engaged by a released and dropping bobbin.

5. An apparatus according to claim 1 wherein said storage means include a container for bobbins, said container having a width corresponding to the length of bobbins, said container having a bottom wall formed with an opening for the passage of bobbins, a hopper having an upper inlet registering with said opening in said container, and having at the lower end said outlet portion, and a closure slide operable for closing said opening in said bottom wall of said container.

6. An apparatus according to claim 1 and including guiding means located between said lower end portion of said chute means and said transporting means and holders, said guide means guiding each bobbin during attachment to the respective holder, and having a lateral opening for the passage of the attached bobbin transported in the direction of said row of holders by said transporting means away from said chute means.

7. An apparatus according to claim 6 wherein said guiding means include a pair of opposite resilient guide members having curved portions for engaging a bobbin and resiliently yielding during movement of the bobbin with said transporting means.

8. An apparatus according to claim 6 wherein said guiding means is spaced from said lower end portion of said chute means and forms a guiding passage aligned with said chute means.

9. An apparatus according to claim 6 wherein said guiding means is a U-shaped wall portion forming an extension of said lower end portion of said chute means and engaging the upper end of a bobbin supported by the respective holder.

10. An apparatus for loading bobbins on holders, comprising, in combination, storage means for storing tapered bobbins having a narrower end and a thicker end, and including an outlet portion having a cross section for the passage of bobbins in substantially horizontal positions; chute means downwardly extending from said outlet portion and having an upper end portion whose cross section is shaped for entry and passage of horizontal bobbins and a lower end portion whose cross section is shaped for the passage of upright bobbins, said chute means including righting means located intermediate said end portions for turning horizontal bobbins to an upright position; separating means located between said storage means and said chute means for separating first bobbins whose narrower ends point in one direction from second bobbins whose narrower ends point in the opposite direction while said bobbins are located in said storage means; dispensing means located between said outlet portion and said upper end portion of said chute means for successively releasing single bobbins from said storage means into said chute means; and transporting means having a row of holders and being operable to move said holders of said row successively past said lower end portion of said chute means so that said holders successively support single bobbins discharged from said chute means.

11. An apparatus according to claim 10 wherein said outlet portion has a substantially rectangular outlet at the lower end thereof bounded by a pair of opposite elongated walls, and a pair of opposite short walls; and wherein said separating means include a blocking means located near the outlet of said outlet portion in a corner between one of said elongated walls and one of said shorter walls, said blocking means restricting the outlet of said outlet portion to permit passage of the narrower ends of said first bobbins, and to block passage of the thicker ends of said second bobbins whereby the latter are held in a slanted position, one of said elongated walls having a discharge opening having an outline conforming to the shape of a bobbin in said slanted position and being correspondingly slanted to permit the passage of said second bobbins in said slanted position; and discharging means for pushing second bobbins in said slanted position out of said discharge opening whereby only said first bobbins are successively released from said outlet portion into said chute means by said dispensing means.

12. An apparatus according to claim 11 wherein said dispensing means includes a reciprocable member movable between a blocking position closing the outlet of said outlet portion and a releasing position opening said outlet, said reciprocable member including a stop wall located in said releasing position to prevent the dropping of the bobbin following said lowermost bobbin, said stop wall engaging second bobbins in said slanted position and pushing the same out of said discharge opening during movement of said reciprocating member from said blocking position to said releasing position.

13. An apparatus according to claim 11 wherein said chute means include first and second channels, said first channel registering with said outlet portion for receiving first bobbins, and said second channel communicating with said discharge opening for receiving second bobbins discharged through said discharge opening, said first channel having first righting means for placing first bobbins in an upright position with the narrower end of the same pointing upward, and said second channel having second righting means for placing second bobbins in an upright position with the narrower ends pointing upward, said second channel opening into said first channel below said first and second righting means so that said first and second bobbins which were disposed in inverted positions in said storage means, are placed on said holders in the same upright position.

14. An apparatus according to claim 13 wherein said righting means include curved wall portions of said chute means between said upper and lower end portions, said curved wall portions having a lower steep part and an upper less steep part.

15. In combination with storage means for storing tapered bobbins at random in substantially horizontal positions in which the narrower ends of first bobbins point in one direction and the narrower ends of second bobbins point in the opposite direction, apparatus for separating the first and second bobbins comprising a substantially rectangular outlet portion of said storage means having a pair of opposite long walls and a pair of opposite short walls spacing said long walls a distance slightly greater than the largest diameter of said bobbins, a blocking means in a corner between one of said long walls and a short wall, and having such a thickness as to permit the narrower ends of said first bobbin to pass between said blocking means and the other long wall and to block passage of the second bobbins by engagement of the thicker end of the same in a slanted position, one of said long walls having a slanted discharge opening registering with second bobbins in said slanted position; and means for opening and closing said outlet end portion for discharging first bobbins through the lower end of said outlet portion and for discharging second bobbins in said slanted position through said discharge opening whereby said first and second bobbins are separated.

16. An apparatus for separating bobbins according to claim 15 and comprising a first chute means having an upper inlet opening registering with the outlet opening of said outlet portion for receiving first bobbins; and a second chute means having an upper end communicating with said discharge opening to receive said second bobbins discharged from said discharge opening so that said first and second bobbins are located in the upper portions of said first and second chute means in inverted horizontal positions, each of said chute means including righting means for turning the respective first and second bobbins to an upright position in which the narrower ends of the same point upward.

17. A separating apparatus according to claim 16 wherein said righting means are curved walls of said first and second chute means, said curved walls being convex in opposite direction to turn said inverted first and second bobbins to the same upright position.

(References on following page)

References Cited

UNITED STATES PATENTS

| | | | |
|---|---|---|---|
| 870,108 | 11/1907 | Kowastch et al. | 221—299 X |
| 1,012,106 | 12/1911 | Seavey | 221—204 X |
| 1,099,705 | 6/1914 | Kolb | 221—13 |
| 1,606,883 | 11/1926 | McCrory et al. | 221—200 |
| 1,696,659 | 12/1928 | Ward | 221—14 X |
| 1,799,106 | 3/1931 | Laxo | 221—14 X |
| 1,852,392 | 4/1932 | Axelson et al. | 221—204 |
| 2,618,394 | 11/1952 | Miller | 221—224 X |
| 2,916,125 | 12/1959 | Wallberg | 221—175 X |
| 3,045,865 | 7/1962 | Trotta | 221—200 X |

FOREIGN PATENTS 570,560  12/1957  Italy.

WALTER SOBIN, *Primary Examiner.*